(12) United States Patent
Nagashima et al.

(10) Patent No.: US 7,379,406 B2
(45) Date of Patent: May 27, 2008

(54) OPTICAL RECORDING APPARATUS, AND METHOD FOR CONTROLLING LASER POWER THEREIN BY FILTERING AND THEN SAMPLING A RETURNED LIGHT SIGNAL

(75) Inventors: Kenji Nagashima, Kanagawa (JP); Eiji Kumagai, Kanagawa (JP); Satoshi Kumai, Kanagawa (JP); Toshio Morizumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 09/963,076

(22) Filed: Sep. 24, 2001

(65) Prior Publication Data

US 2002/0071366 A1 Jun. 13, 2002

(30) Foreign Application Priority Data

Sep. 25, 2000 (JP) ............................. 2000-290917

(51) Int. Cl.
*G11B 7/125* (2006.01)
(52) U.S. Cl. .................................. 369/59.11
(58) Field of Classification Search ............. 369/59.11, 369/47.5, 47.51, 47.53
See application file for complete search history.

(56) References Cited

U.S. PATENT DOCUMENTS

| | | | |
|---|---|---|---|
| 4,283,785 A | 8/1981 | Miyauchi et al. | |
| 4,811,329 A | 3/1989 | Shikama et al. | |
| 5,109,373 A * | 4/1992 | Ohno et al. | 369/100 |
| 5,215,099 A * | 6/1993 | Haberl et al. | 600/515 |
| 5,359,589 A * | 10/1994 | Mashimo | 369/47.51 |
| 5,436,880 A * | 7/1995 | Eastman et al. | 369/47.51 |
| 5,646,919 A * | 7/1997 | Eastman et al. | 369/44.26 |
| 5,648,952 A * | 7/1997 | Maegawa et al. | 369/116 |
| 5,712,839 A * | 1/1998 | Aoki | 369/47.52 |
| 5,835,476 A * | 11/1998 | Yamasaki et al. | 369/116 |
| 5,872,763 A * | 2/1999 | Osakabe | 369/47.53 |
| 5,898,655 A * | 4/1999 | Takahashi | 369/47.53 |
| 6,052,347 A * | 4/2000 | Miyata | 369/47.53 |
| 6,414,912 B1* | 7/2002 | Sukeda et al. | 369/13.27 |
| 6,657,935 B2* | 12/2003 | Eguchi et al. | 369/59.1 |
| 6,678,228 B1* | 1/2004 | Kando et al. | 369/47.51 |

FOREIGN PATENT DOCUMENTS

| | | |
|---|---|---|
| EP | 0 871 169 | 10/1998 |
| EP | 0 907 168 | 4/1999 |

* cited by examiner

*Primary Examiner*—David Davis
*Assistant Examiner*—Michael V. Battaglia
(74) *Attorney, Agent, or Firm*—Oblon, Spivak, McClelland, Maier & Neustadt, P.C.

(57) ABSTRACT

After the initiation of writing, an output signal from an LPF is sampled in correspondence with a portion with a predetermined pulse width of recording data, so as to obtain a pit level. In the resultant signal, its varying portions which correspond to the multi-pulse trains of the write signal are smoothed. A controller modifies a level of a target level signal to be supplied to an APC circuit in such a manner that the pit level becomes an optimum pit level which has been obtained prior to the initiation of writing.

16 Claims, 11 Drawing Sheets

FIG. 1A (CLK)
FIG. 1B (RD)
FIG. 1C (LASER POWER)
FIG. 1D (WRF)
FIG. 1E (PIT)
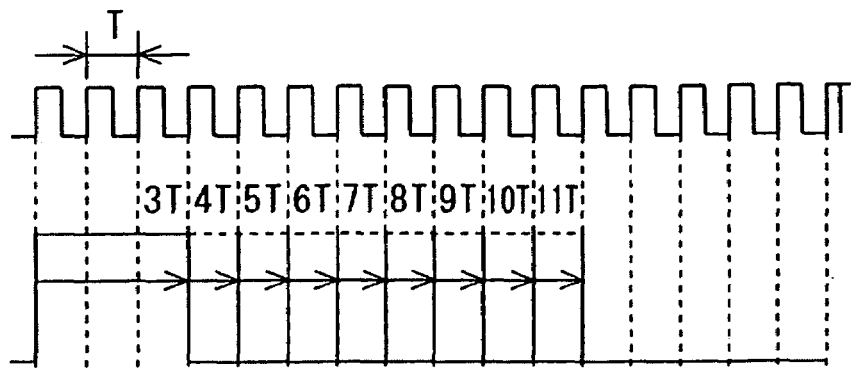
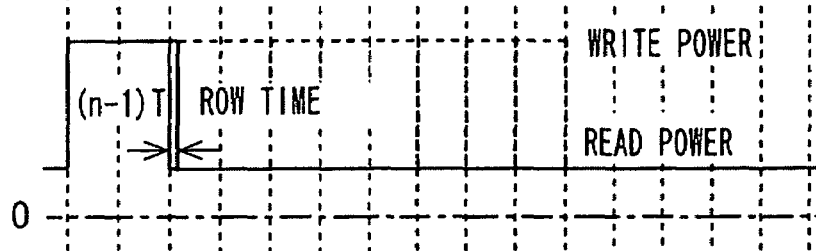
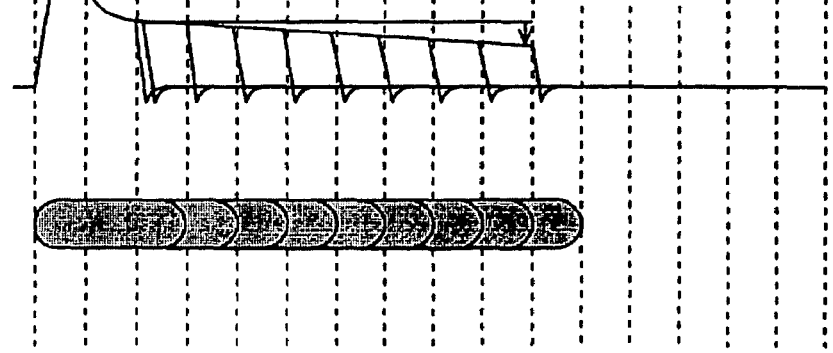
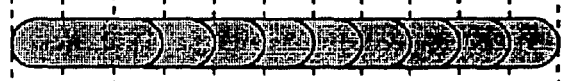
(PRIOR ART)

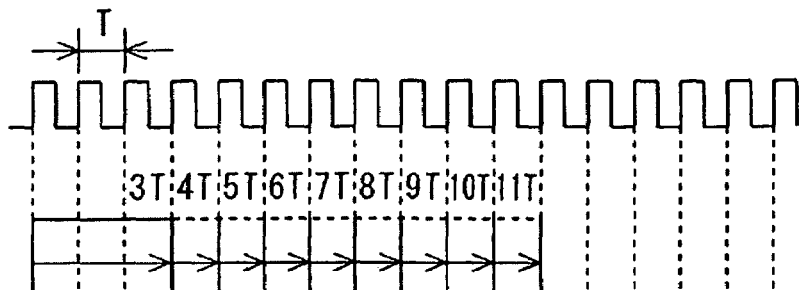
FIG. 2A (CLK)
FIG. 2B (RD)
FIG. 2C (LASER POWER)
FIG. 2D (WRF)
FIG. 2E (PIT)
(PRIOR ART)

(WRF)

(LASER POWER)

(PRIOR ART)

($\tau = 0$)

HEATING AMOUNT = RADIATION AMOUNT ($\tau > 0$)

HEATING AMOUNT > RADIATION AMOUNT ($\tau \gg 0$)

HEATING AMOUNT $\gg$ RADIATION AMOUNT (PRIOR ART)

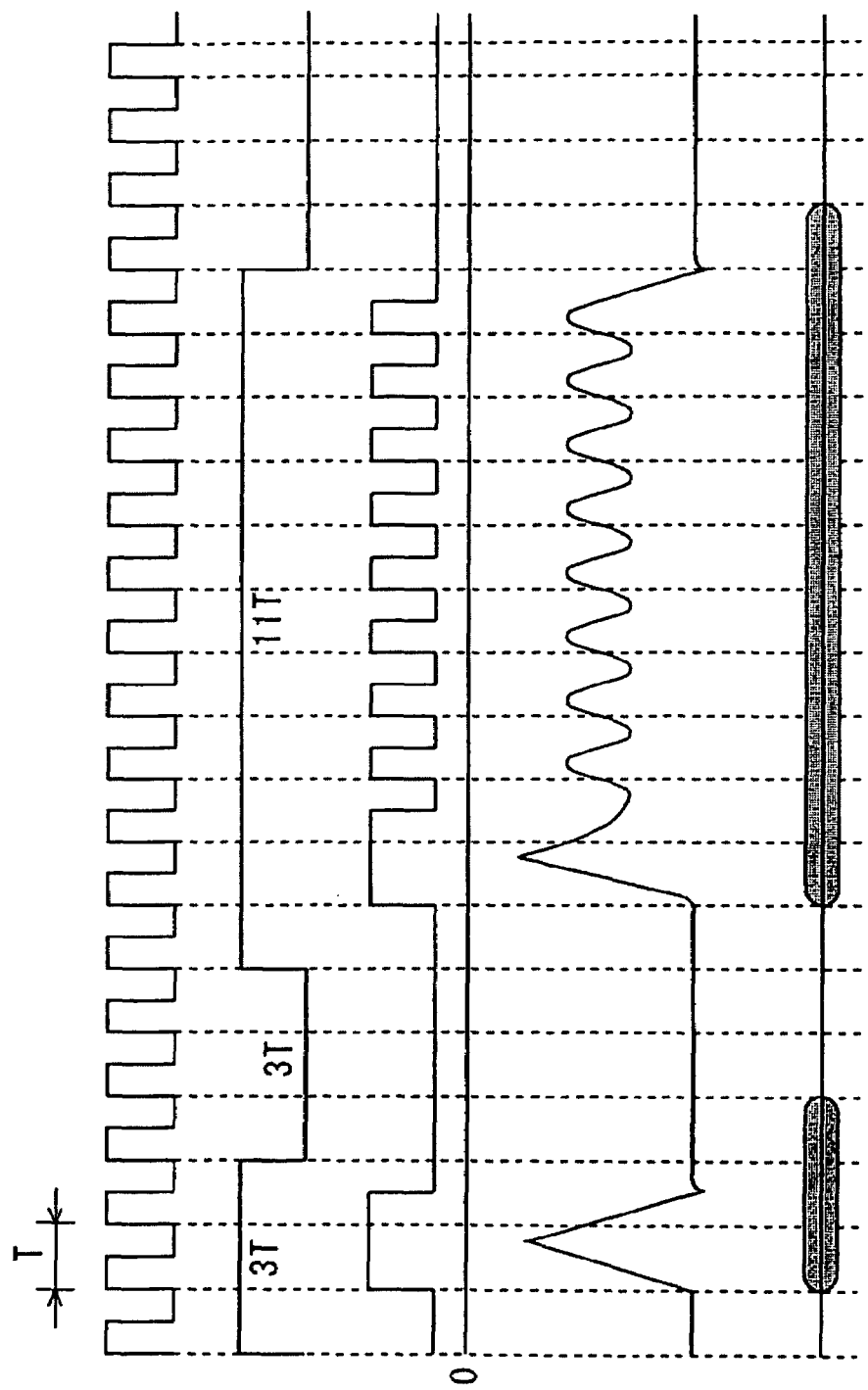

(WRF)

(SAMPLE PULSE)

(PRIOR ART)

(WRF)

(SAMPLE PULSE)

(PRIOR ART)

F I G. 1 2 A
(WRF)
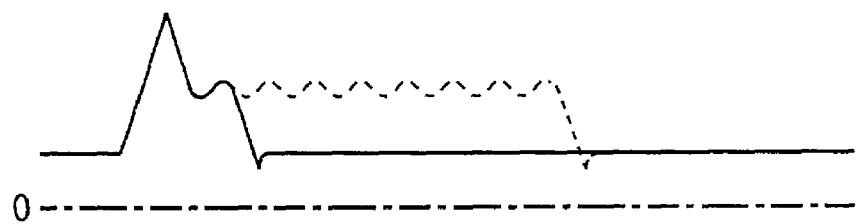
F I G. 1 2 B
(WRF')
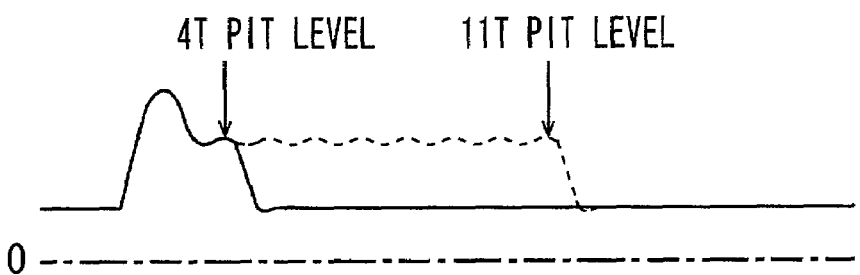
F I G. 1 2 C
(Psmp)

OPTICAL RECORDING APPARATUS, AND METHOD FOR CONTROLLING LASER POWER THEREIN BY FILTERING AND THEN SAMPLING A RETURNED LIGHT SIGNAL

BACKGROUND OF THE INVENTION

1. Field of the Invention

The present invention relates to an optical recording apparatus for performing recording by use of multi-pulse trains, that is, pulse train recording onto a recording medium, and a method for controlling laser power therein. Specifically, the present invention relates to an optical recording apparatus and the like in which light returned from the recording medium is detected and an average level signal of the detected signal thereof is obtained, and then, laser power is controlled in such a manner that the level of the average level signal becomes a predetermined level thereby enabling to stably control the write power during a recording operation, even in the case of performing pulse train recording.

2. Description of the Related Art

Conventionally, a CD-Recordable (CD-R) drive as an optical recording apparatus employs write strategies referred to as row and column write strategies (i.e. write power controlling methods), in order to form pits in correct lengths which correspond to pulses of recording data RD onto a disc (i.e. CD-R).

Description will be made on the case where recording is performed by employing a row write strategy, with reference to FIGS. 1A to 1E. FIG. 1A shows a basic channel clock CLK with a period T. FIG. 1B shows recording data RD. The recording data RD has been obtained by performing Non-Return to Zero Inverted (NRZI) conversion for a modulation signal resulted from Eight to fourteen Modulation (EFM). As conventionally known, in the recording data RD, each period with pulses "1" and "0" has a time length from 3T to 11T, respectively.

In the row write strategy, as shown in FIG. 1C, a portion "1" corresponding to only 1T is deleted from the time lengths 3T to 11T of the recording data RD. Then, a time corresponding to a row time is added only to the portion with a time length 3T to render the laser power to the write power, and in this state, pits are formed on the disc, as shown in FIG. 1E. FIG. 1D shows a write RF signal WRF obtained by detecting the light returned from the disc in a recording operation.

Next, description will be made on the case where recording is performed by employing the column write strategy, with reference to FIGS. 2A to 2E. FIG. 2A shows a basic channel clock CLK with a period T. FIG. 2B shows recording data RD. As has been described above, the recording data RD has been obtained by performing Non-Return to Zero Inverted conversion for a modulation signal resulted from Eight to fourteen Modulation (EUM), and each period with pulses "1" and "0" has a time length from 3T to 11T, respectively.

In the column write strategy, as shown in FIG. 2C, a portion "1" corresponding to only 1T is deleted from the time lengths 3T to 11T of the recording data RD. Then, only the first column time is provided with a peak power larger than the write power by a level corresponding to the column amount, while the remaining column time is provided with a write power, and in this state, pits are formed on the disc, as shown in FIG. 2E. FIG. 2D shows a write RF signal WRF obtained by detecting the light returned from the disc in a recording operation.

The reason why a portion "1" corresponding to only 1T is deleted from the time lengths 3T to 11IT of the recording data RD when recording is performed by employing the row write strategy or the column write strategy described above is as follows. Since the spot of the laser beam formed on the disc has a certain size, the pits actually formed on the disc respectively have a length resulted from adding an extended amount of the pits caused by the shape of the spot of the laser beam to the pit length corresponding to the irradiation time of the laser beam at a write power.

Description will be made on the waveform of the write RF signal WRF, with reference to FIGS. 3A and 3B. FIG. 3B shows a laser power, and FIG. 3A shows a write RF signal WRF obtained corresponding to the laser power.

A Read level is a level of the RF signal in the read state before writing is performed, and is determined by a read power and a reflection ratio (i.e. sensitivity) of the disc (i.e. medium). A peak level is a level of the RF signal immediately after the laser power is switched to the write power. Since a CUR is designed for thermal recording, pits are not formed immediately after the laser power is switched to the write power. During the short period until the pits are formed, the level of the RF signal increases to the level determined by the write power and the reflection ratio of the disc.

The pit level is a level at which the level of the RF signal converges when it starts to gradually decrease from the peak level after the laser power is switched to the write power. The reason why the level of the RF signal gradually decreases is that the reflection ratio of the disc decreases due to the formation of pits. The bottom level is a level of the RF signal immediately after the laser power is switched to the read power. The level of the RF signal decreases to the bottom level, and after that, passes through the read setting time and increases to the read level.

FIGS. 4A to 4C respectively show a relationship between a thermal time constant of a disc (i.e. medium) $\tau$ and a waveform of the write RF signal WRF.

FIG. 4A shows the case where the relationship of $\tau=0$ is established. In this case, the relationship of heating amount=radiation amount is established, and there is no movement of the pit forming point. Therefore, there is no decrease in the pit level. In this state, it is possible to form pits whose lengths are proportional to the pulse time, independent of the length of write pulse, and jitter is unlikely to occur.

FIG. 4B shows the case where the relationship of $\tau>0$ is established. In this case, the relationship of heating amount>radiation amount is established, and there is a slight movement of the pit forming point. Therefore, there is a slight decrease in the pit level. In this state, the pit length gradually becomes disproportional to the pulse length of the write pulse, and jitter occurs.

FIG. 4C shows the case where the relationship of $\tau>>0$ is established. In this case, the relationship of heating amount>>radiation amount is established, and there is a large movement of the pit forming point. Therefore, there is a sharp decrease in the pit level. In this state, large jitter occurs.

When recording is performed by employing the row write strategy described above, as shown in FIG. 1D, the pit level gradually decreases. Therefore, the pit forming point is deviated, resulting in jitter occurrence. Contrary to this, when recording is performed by employing the column write strategy, as has been described above, the signal level is increased to the peak power first, and then, is decreased to the write power to establish the relationship of heating amount=radiation amount. In this manner, the deviation of the pit forming point can be prevented. Therefore, all the pits from 3T to 11T can be written at (n−1)T, thereby avoiding the occurrence of jitter.

In addition, in order to form a recording mark in a correct length which corresponds to the pulse of the recording data RD, a pulse train write strategy has been conventionally employed in a CD-ReWritable (CD-RW) drive, although not employed in a CD-R drive. The pulse train write strategy performs recording by converting the recording data RD into multi pulse trains. As compared with the cases of single pulse recording (i.e. row write strategy and column write strategy), the pulse train write strategy can lower the shifts in both the front and rear edges of the recording mark by closely controlling the on-off operation of the laser to suppress the influence of thermal storage to a minimum value.

Description will be made on the case where recording is performed by employing the pulse train write strategy, with reference to FIGS. 5A to 5E. FIG. 5A shows a basic channel clock CLK with a period T. FIG. 5B shows recording data RD. As has been described above, the recording data RD has been obtained by performing Non-Return to Zero Inverted conversion for a modulation signal resulted from Eight to fourteen Modulation (EFM), and each period with pulses "1" and "0" has a time length from 3T to 11T, respectively.

In the pulse train write strategy, as shown in FIG. 5C, the portion of "1" having a length from 3T to 11T of the recording data RD is converted into multi-pulse trains to render the laser power to the write power intermittently, and then, a recording mark is formed on the disc as shown in FIG. 5E. FIG. 5D shows a write RF signal WRF obtained by detecting the light returned from the disc at the time of recording.

In the CD-R drive described above, the laser power is controlled, that is, running optimum power control (R-OPC) is performed during recording operation. The purpose of the R-OPC is to absorb the variations in reflection ratios at inner and outer peripheries (non-uniformity in coating of a recording layer and the like) of the disc (CD-R), a change in the distribution of spot strengths at coma aberration generated as a result of the skew of the disc, a change in the laser wavelength resulted from an increase in temperature, and the like.

In the CD-R drive, before writing is s trial writing is usually performed in a power caribration area (PCA) provided to the disc to obtain an optimum write power. However, due to the reason described above, if the writing is performed at the same write power from the initiation to the end of the writing, it is impossible to perform writing in such a manner that the jitter is always suppressed to a minimum value.

Therefore, the optimum power is obtained in the PCA (i.e. the value at which the asymmetry becomes optimum), and simultaneously, the pit level at this time is obtained as an optimum pit level. Then the write power is controlled in such a manner that the pit level becomes optimum during recording operation. This arrangement enables recording to be always performed in the same writing manner.

In order to control the write power in such a manner that the pit level becomes optimum during recording operation, it is necessary to detect the pit level during recording operation The pit level is detected by sampling the write RF signal WRF obtained in the portion with the predetermined pulse width of the recording data RD at the sample timing corresponding to the pulse width.

FIG. 6A shows a write RF signal WRF corresponding to the portions with pulse widths 4T, 11T in the case where recording is performed by employing the column write strategy. FIG. 6B shows a sample pulse for detecting a pit level at the portion with each of the pulse widths, and the sampling is performed at the timing when the writing RF signal WRF becomes at a constant level. The write RF signal WRF becomes at a constant level at the portion with a relatively wide pulse width, and actually, the sampling of pit level is performed corresponding to the portion with the pulse width of 6T or larger for example.

When recording is performed by employing the column write strategy as described above, R-OPC can be performed satisfactorily by detecting the pit level of the write RF signal WFR which corresponds to the portion with a predetermined pulse width.

However, when recording is performed by employing the pulse train write strategy, it is difficult to detect the pit level of the write RF signal WRF which corresponds to the portion with a predetermined pulse width unlike the above described case. As a result, it is impossible to perform R-OPC.

Specifically, when the recording is performed by employing the pulse train write strategy, as shown in FIG. 7A, the write RF signal WRF which corresponds to the portions with the pulse widths 4T, 11T varies corresponding to the write pulse (i.e. multi-pulse trains). Therefore, if the pit level of the portion with each of the pulse widths is detected by the sample pulse shown in FIG. 7B, it is impossible to obtain a detected pit level in a stable manner, and it is impossible to perform R-OPC.

SUMMARY OF THE INVENTION

Under the circumstances described above, the objective of the present invention is provide an optical recording apparatus and the like capable of controlling write power in a stable manner during recording operation, even in the case of performing pulse train recording.

In the present invention, an optical recording apparatus in which recording data is converted into multi-pulse trains, and a laser beam is emitted from a laser light source in correspondence with the multi-pulse trains, and the laser beam is irradiated on a recording medium to record the recording data on the recording medium includes: photodetecting means of detecting light returned from the recording medium; averaging means of obtaining an average level signal of a detected signal detected in the photodetecting means in correspondence with the portion with a predetermined pulse width of the recording data; and laser power controlling means of controlling the power of the laser beam output from the laser light source in such a manner that the level of the average level signal obtained in the averaging means becomes a predetermined level.

In addition, in the present invention, a method for controlling laser power in an optical recording apparatus in which recording data is converted into multi-pulse trains, and a laser beam is emitted from a laser light source in correspondence with the multi-pulse trains, and the laser beam is irradiated on a recording medium to record the recording data on the recording medium, includes: obtaining a detected signal of light returned from the recording medium; obtaining an average level signal of the detected signal in correspondence with the portion with a predetermined pulse width of the recording data and controlling the power of the laser beam output from the laser light source in such a manner that the level of the average level signal obtained in the averaging means becomes a predetermined level.

In the present invention, pulse train recording is performed for a recording medium. Specifically, recording data is converted into multi-pulse trains, and a laser beam is emitted from a light source in correspondence with the multi-pulse trains. The laser beam is then irradiated to the recording medium; thereby recording the recording data into the recording medium.

When the recording data is recorded, the light returned from the recording medium is detected to obtain a detected signal. The detected signal varies in correspondence with the multi-pulse trains. Therefore, an average level signal of the detected signal is obtained in correspondence with the portion with a predetermined pulse width of the recording data. The average level signal is obtained at predetermined time intervals, for example.

For example, the detected signal is converted into a digital signal by a high-speed A/D converter, and the conversion values are averaged to obtain the average level signal. Alternatively for example, the detected signal is subjected to band limitation by a low-pass filter to be smoothed. After that, the resultant signal is sampled at a predetermined timing which corresponds to the portion with a predetermined pulse width to obtain the average level signal. In this case, the signal may be sampled at plural timings, and then, the resultant plural signals are averaged to obtain the average level signal. As a result, even if smoothing is insufficient, it is possible to obtain the average level signal in a stable manner.

Then, the power of the laser beam output from the laser light source is controlled in such a manner that the level of the average level signal (at a pit level) becomes a predetermined level. As a result, even if pulse train recording is performed, the write power can be controlled in a stable manner during recording operation.

BRIEF DESCRIPTION OF THE DRAWINGS

FIGS. 1A to 1E are the diagram for illustrating the case where recording is performed by employing a row write strategy;

FIGS. 2A to 2E are the diagram for illustrating the case where recording is performed by employing a column write strategy;

FIGS. 5A to 5E are the diagram for illustrating the case where recording is performed by employing a pulse train write strategy;

FIGS. 12A to 12C are the diagram for illustrating an operation of sampling a pit level according to an embodiment of the present invention.

DESCRIPTION OF THE PREFERRED EMBODIMENT

Figure 3A:
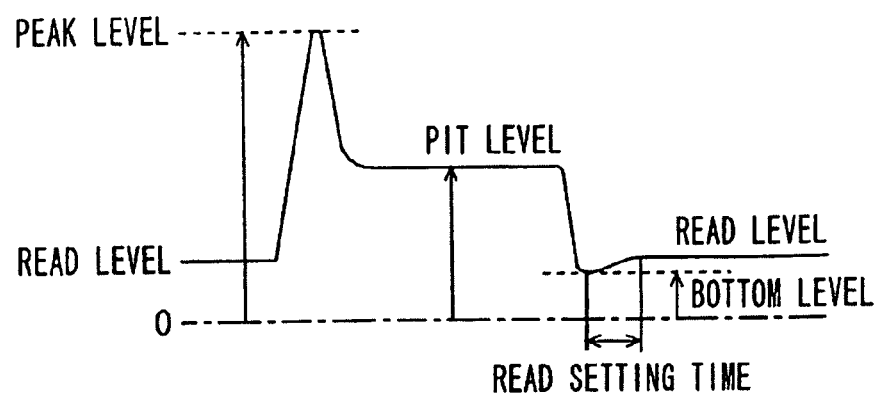
FIGS. 3A and 3B are the diagram for illustrating a waveform of a write RF signal WRF.
Figure 3B:
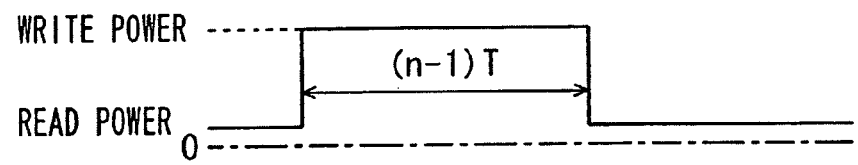
Figure 4A:
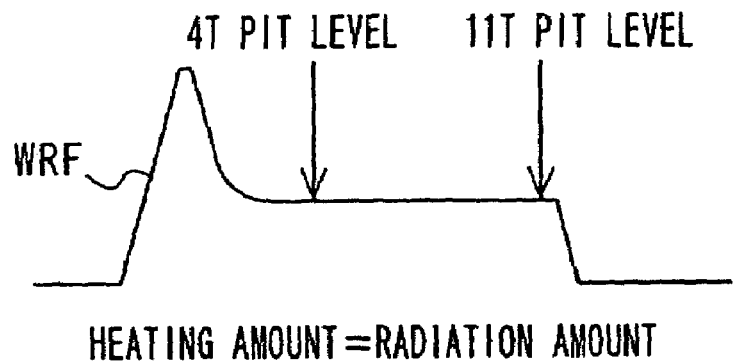
FIGS. 4A to 4C are the diagram for illustrating a relationship between a thermal time constant τ of a disc (i.e. medium) and a waveform of a write RF signal WRF.
Figure 4B:
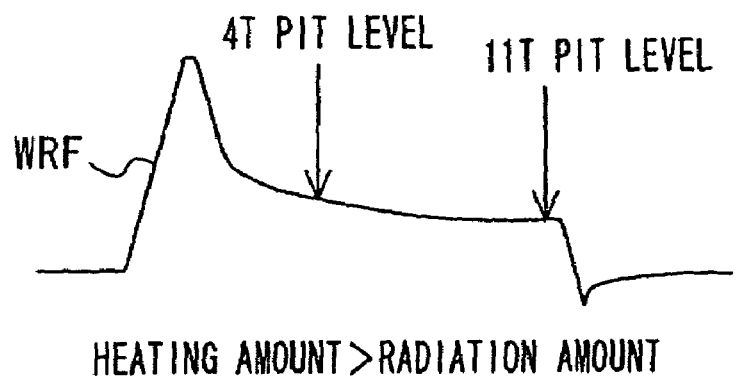
Figure 4C:
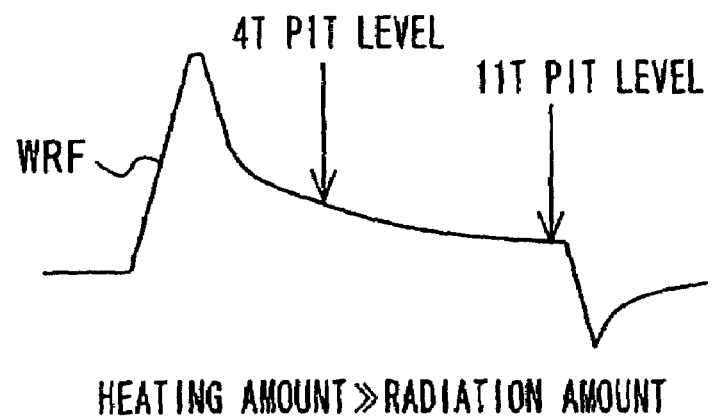
Figure 6A:
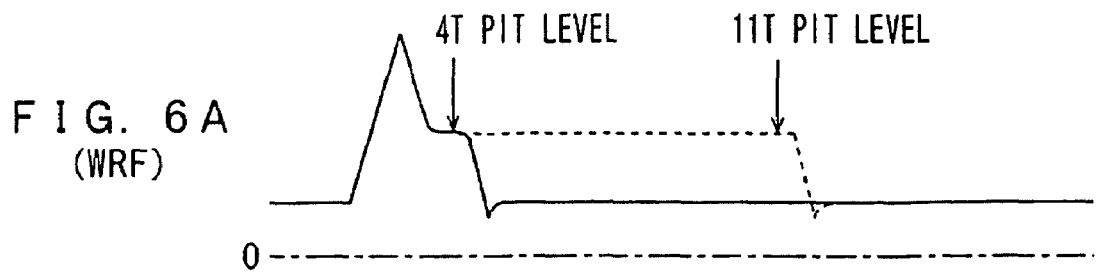
FIGS. 6A and 6B are the diagram for illustrating an operation of sampling a pit level (in a column write strategy)
Figure 6B:
Figure 7A:
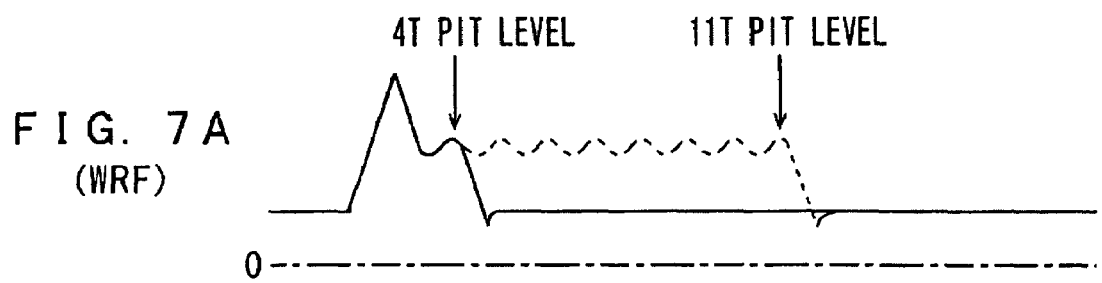
FIGS. 7A and 7B are the diagram for illustrating an operation of sampling a pit level (in a pulse train write strategy)
Figure 7B:
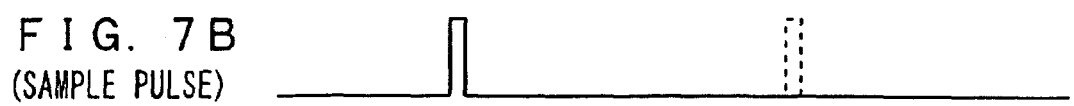
Figure 8:
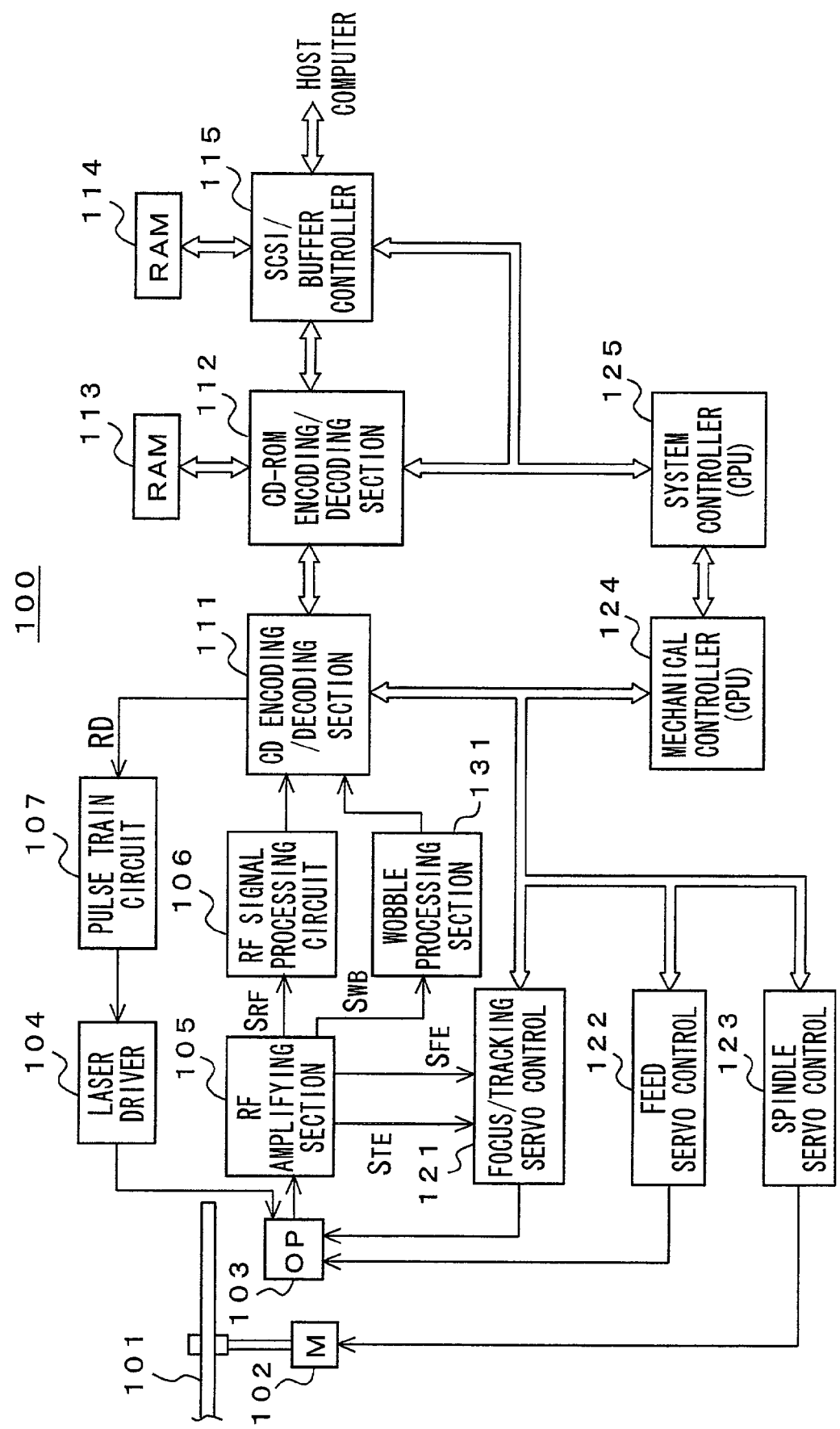
FIG. 8 is a block diagram showing a structure of a CD-R drive according to an embodiment of the present invention.

Hereinafter, embodiments of the present invention will be described, with reference to drawings. FIG. 8 shows a structure of a CD-R chive 100 according to an embodiment of the present invention.

A disc (i.e. CD-R) 101 to be handled in the drive 100 includes, although not shown in FIG. 8, grooves GR formed in the spiral shape on its data recording surface. Data is recorded and reproduced using the grooves GR as tracks.

The grooves GR are slightly wobbled, and are used as addresses (i.e. positional information about blank disc) for recording. Such grooves are referred to as Absolute Time in Pregrooves (ATIPs) which have been developed for the purpose of addressing in a disc having relatively long basic data units such as a CD. The recorded time information is identical to that recorded in a Q channel of a subcode in a normal CD.

The ATIPs generate, on top of address information used in a recording operation, a synchronous signal for rotary servo in a recording operation; and also include various kinds of control signals. Examples of the control signals recorded in the ATIPs include: the read-in start time indicating the longest time in which recording is possible; the read-out start time when the program length is the longest; the write power recommended for the medium; the type of disc, and the like.

The drive 100 also includes: a spindle motor 102 for driving the disc 101 to rotate at a constant linear velocity; an optical pickup 103 constituted by a semiconductor laser, an object lens, a photodetector, and the like; a laser driver 104 for controlling the beam emitted from the semiconductor laser of the optical pickup 103; and a RF amplifying section 105 for processing an output signal from the photodetector which is included in the optical pickup 103 to obtain a reproduction RF signal $S_{RF}$, a tracking error signal $S_{TE}$, a focus error signal $S_{FE}$, and a wobble signal $S_{WB}$ which corresponds to each of the wobbles of the grooves GR. The reproduction RF signal $S_{RF}$ is used as a write RF signal WRF in a recording operation.

The laser beam (not shown in a figure) emitted from the semiconductor laser included in the optical pickup 103 is irradiated to the recording surface of the disc 101, and the light reflected by the recording surface is irradiated to the photodetector included in the optical pickup 103. The RF amplifying section 105 generates a tracking error signal $S_{TE}$ by a three-spot method, and also generates a focus error signal $S_{FE}$ by an astigma method (i.e. astigmatism method).

The drive 100 also includes: a RF signal processing circuit 106 for performing processings such as waveform equalization and signal detection for the reproduction RF signal $S_{RF}$ output from the RF amplifying section 105 to obtain CD data; and a pulse train circuit 107 (see FIGS. 5B and 5C) for converting the recording data RD output from a CD encoding/decoding section, which will be described later, into multi-pulse trains, and then for supplying the resultant multi-pulse trains to the laser driver 104. The laser beam emitted from the semiconductor laser included in the optical pickup 103 is subjected to on-off modulation by the multi-pulse trains supplied from the pulse train circuit 107, and as a result of this modulation, the recording data RD is recorded in the disc 101.

The drive 100 also includes: a CD encoding/decoding section 111; and a CD-ROM encoding/decoding section 112. The CD encoding/decoding section 111 performs demodulation against Eight to fourteen Modulation (EFM for the CD data output from the RF signal processing circuit 106 in a reproducing operation and also performs error correction by use of a Cross Interleave Reed-Solomon Code (CIRC) to obtain CD-ROM data. In addition, the CD encoding/decoding section 111 adds a parity by use of a CIRC to the CD-ROM data output from the CD-ROM encoding/decoding section 112 in a recording operation, and performs modulation of EFM to obtain CD data, and then, performs Non Return to Zero Inverted (NRZI) conversion to the CD data to obtain recording data RD.

The CD-ROM encoding/decoding section 112 performs processings such as descrambling and error correction for the CD-ROM data output from the CD encoding/decoding section 111 in a reproducing operation to obtain read data. Also in a recording operation, the CD-ROM encoding/decoding section 112 performs processings such as addition of parity for error correction and scrambling for the write data received from a SCSI/buffer controller, which will be described later, to obtain CD-ROM data. To the CD-ROM encoding/decoding section 112, a Random Access Memory (RAM) 113 is connected as a working memory for performing the processings described above.

The drive 100 also includes a Small Computer System Interface (SCSI)/buffer controller 115. The SCSI/buffer controller 115 receives a command from a host computer, and supplies it to a system controller. In a reproducing operation, the SCSI/buffer controller 115 transmits the read data output from the CD-ROM encoding/decoding section 112 to the host computer via the RAM 114 as a buffer memory In a recording operation, the SCSI/buffer controller 115 supplies the write data, transmitted thereto from the host computer, to the CD-ROM encoding/decoding section 112 via the RAM 114.

The drive 100 also includes: a focus/tracking servo controlling circuit 121 for performing focus servo and tracking servo for the optical pickup 103, based on the focus error signal $S_{FE}$ and the tracking error signal $S_{TE}$ which are output from the RF amplifying section 105; a feed servo controlling circuit 122 for allowing the optical pickup 103 to move at the time of access; and a spindle servo controlling circuit 123 for controlling the rotation number of the spindle motor 102 to be a predetermined value. The operations of the servo controlling circuits 121 to 123 are controlled by a mechanical controller 124 which includes a central processing unit (CPU).

The drive 100 also includes a system controller 125 for controlling the operations of the entire system. The system controller 125 includes a CPU.

The drive 100 also includes a wobble processing section 131 for demodulating the signal of ATIP from the wobble signal $S_{WB}$ output from the RF amplifying section 105. The signal of ATIP obtained in the wobble processing section 131 is supplied to the mechanical controller 124 and the system controller 125 via the CD encoding/decoding section 111, and is used for various controls.

Figure 9:
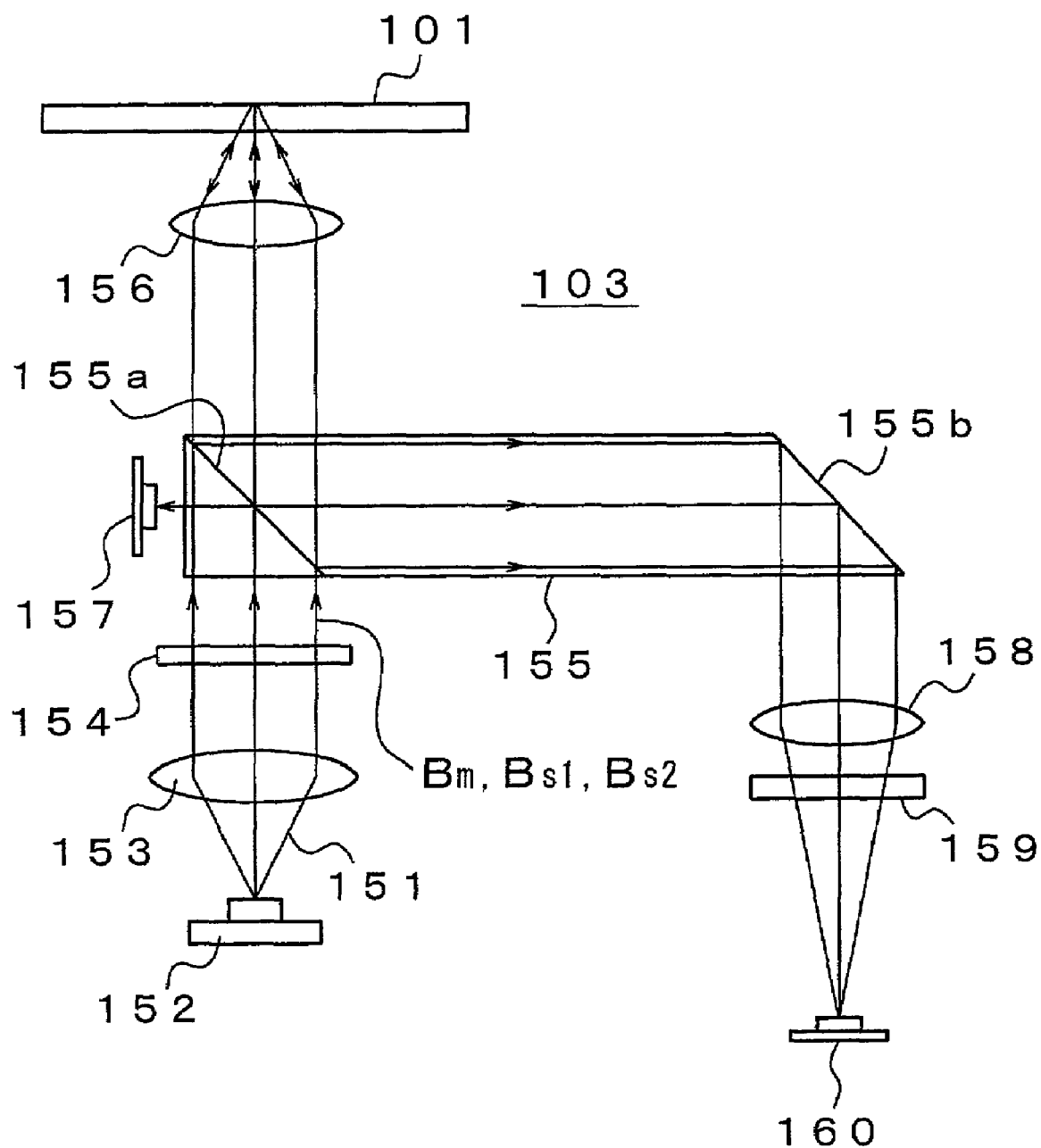
FIG. 9 is a diagram showing a structure of an optical system of an optical pickup.

Next, the optical pickup 103 will be described in detail. FIG. 9 shows a structure of an optical system of the optical pickup 103.

The optical pickup 103 includes: a semiconductor laser 152 for emitting a laser beam 151; a collimator lens 153 for shaping the laser beam 151 emitted from the semiconductor laser 152 from the form of diverging lights into the form of parallel lights, and a grating (i.e. diffraction grating) 154 for generating 3 beams. The grating 154 generates a main beam Bm by 0-dimensional light, and the first and second side beams, Bs1 and Bs2, by ±1-dimensional lights respectively.

The optical pickup 103 also includes: a beam splitter 155; an object lens 156 for irradiating the laser beam onto the recording surface of the disc 101; and a photodetector 157 for front Auto Power Control (APC). In this case, the laser beam is entered from the grating 154 into the beam splitter 155, and a part thereof is passed through a semi-transparent film 155*a* and is entered into the object lens 156, while the remaining part thereof is reflected by the semi-transparent film 155*a* and is entered into the photodetector 157. A part of the laser beam entered into the beam splitter 155 from the object lens 156 is reflected by the semi-transparent film 155*a*, and is further reflected by a reflection surface 155*b* to be ejected outside. The detected signal SAPC in the photodetector 157 is used for laser power control as a monitor signal for the laser power in recording and reproducing operations.

The optical pickup 103 also includes: a light collecting lens 158 for collecting the laser beam reflected by the reflection surface 155*b* of the beam splitter 155 and then ejected outside, a photodetector 160 into which the laser beam ejected from the light collecting lens 158 is entered; and a multi-lens 159 located between the light collecting lens 158 and the photodetector 160. The multi-lens 159 is constituted a combination of a concaved lens and a cylindrical lens. The cylindrical lens is used to obtain the focus error signal $S_{FE}$ in a known astigma method.

Figure 10:
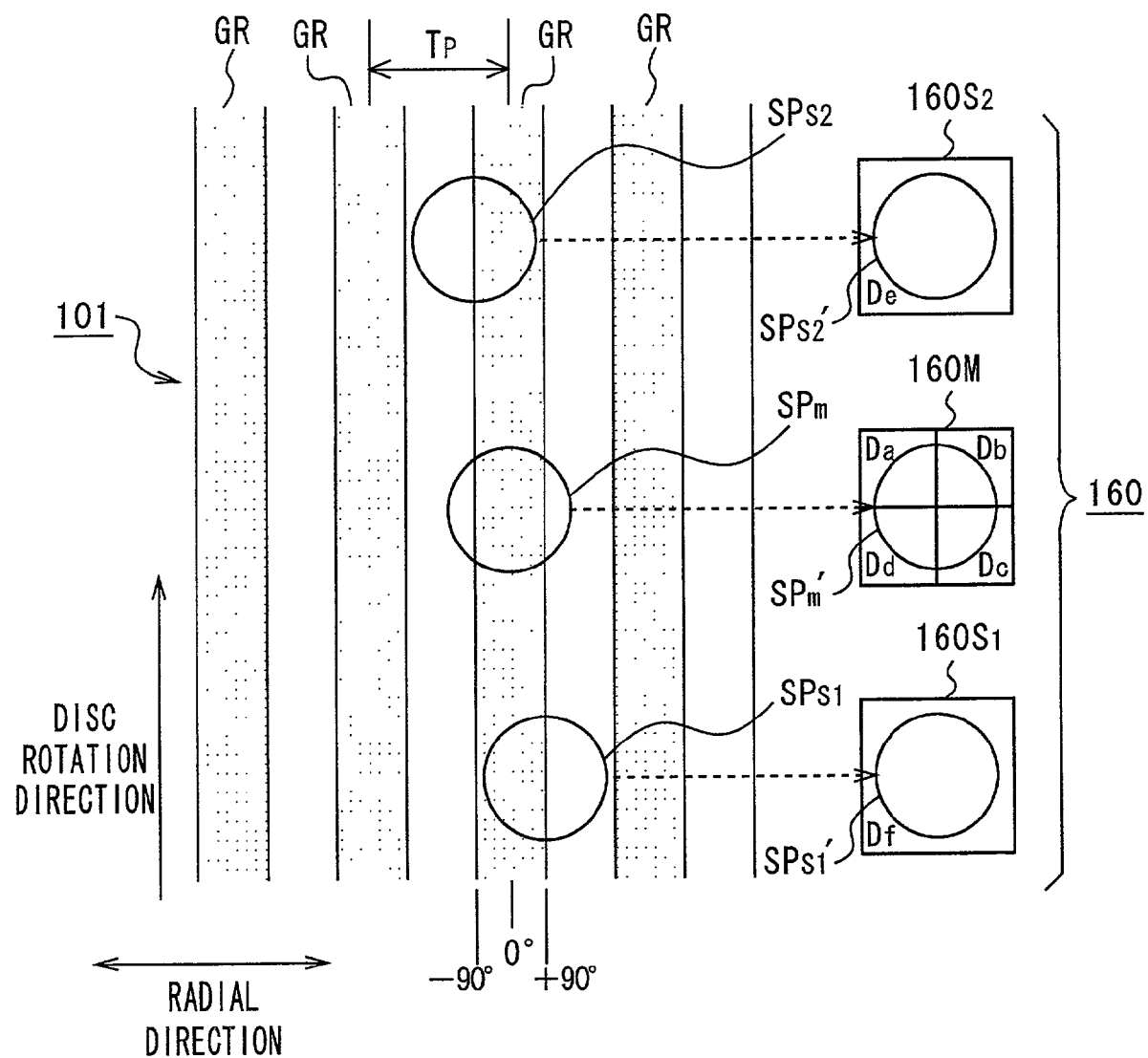
FIG. 10 is a diagram showing a relationship between spots on a disc and spots on a photodetector (i.e. 3-spot method)

As shown in FIG. 10, a main spot SPm by the main beam Bm and side spots SPs1, SPs2 by the side beams Bs1, Bs2 are formed on the disc 101. In this case, the side spots SPs1, SPs2 are respectively formed at predetermined distances away from the main spot SPm in one and the other radial directions.

As has been described above, in an embodiment of the present invention, the tracking error signal $S_{TE}$ is obtained by a three-spot method. Defining each track pitch as Tp, the side spots SPs1, SPs2 are respectively formed at distances of Tp/4 (i.e. 90°) away from the main spot SPm in radial directions. The positioning of the side spots SPs1, SPs2 can be performed by adjusting the angle of the grating 154.

As shown in FIG. 10, the photodetector 160 is constituted by a quadrant photodiode section 160M, and two photodiode sections $160S_1$, $160S_2$.

Hereinafter, an operation of the optical pickup 103 shown in FIG. 9 will be described. The laser beam 151 in the form of diverging lights from the semiconductor laser 152 is shaped into the form of parallel lights by the collimator lens 153, and is entered into he grating 154 where 3 beams (Bm, Bs1, Bs2) are formed. The laser beam ejected from the grating 154 is entered into the beam splitter 155. The laser beam is passed through the semi-transparent film 155*a* of the beam splitter 155, and is irradiated onto the recording surface of the disc 101 via the object lens 156. In this case, as shown in FIG. 10, a spot SPm by the main beam Bm, spots SPs1, SPs2 by the side beams Bs1, Bs2 are formed on the disc 101.

The laser beam (i.e. returned light) reflected by the recording surface of the disc 101 is entered into the beam splitter 155 via the object lens 156, and then is reflected by the semi-transparent film 155*a* and the reflection surface 155*b* in this order. Then, the laser beam is ejected from the beam splitter 155 and is entered into the photodetector 160 via the light collecting lens 158 and the multi-lens 159.

As shown in FIG. 10, spots SPm', SPs1', SPs2' by the laser beam reflected by the spots SPm, SPs1, SPs2 formed on the aforementioned disc 101 are formed respectively on the photodiode sections 160M, $160S_1$, $160S_2$ which constitute together the photodetector 160.

Defining detected signals of four photodiodes Da to Dd constituting the photodiode section 160M as Sa to Sd, a detected of the photodiode Df which constitutes the photodiode section $160S_1$ as Sf, and a detected signal of the photodiode De which constitutes the photodiode section $160S_2$ as Se, the RF amplifying section 105 (see FIG. 8) obtains a reproduction RF signal $S_{RF}$, a focus error signal $S_{FE}$, and a tracking error signal $S_{TE}$ respectively by the following calculations: $S_{RF}=(Sa+Sb+Sc+Sd)$; $S_{FE}=(Sa+Sc)-(Sb+Sd)$; and $S_{TE}=Se-Sf$.

In the RF amplifying section 105, the addition signal of the detected signals Sb, Sc is subtracted from the addition signal of the detected signals Sa, Sd to generate a push-pull signal by the reflected light from the main spot SPm. Then, a wobble signal $S_{WB}$ is extracted from the push-pull signal by a high-pass filter.

Next, an operation of the CD-R chive 100 shown in FIG. 8 will be described.

When a data write command is supplied from the host computer to the system controller 125, data is written (i.e. recorded). In this case, the write data transmitted from the host computer is supplied from the SCSI/buffer controller 115 to the CD-ROM encoding/decoding section 112. The CD-ROM encoding/decoding section 112 performs processings such as addition of parity for error correction and scrambling for the write data to obtain CD-ROM data The CD-ROM data, generated in the CD-ROM encoding/decoding section 112 is supplied to the CD-encoding/decoding section 111. The CD-encoding/decoding section 111 adds a party by use of CIRC to the CD-ROM data, and also performs modulation of EFM to generate CD data. The CD-encoding/decoding section 111 further performs NRZI conversion to the resultant CD data to generate recording data RD.

The recording data RD is converted in the pulse rain 107, and then is supplied to the laser driver 104. Therefore, the laser beam emitted from the semiconductor laser of the optical pickup 103 is subjected to on-off modulation by the multi-pulse trains supplied from the pulse train circuit 107, and as a result, the recording data RD is recorded on the disc 101.

On the other hand, when a data read command is supplied from the host computer to the system controller 125, data is read (i.e. reproduced). A reproduction RF signal $S_{RF}$ is reproduced in the optical pickup 103, and is subjected to a processing such as waveform equalization in the RF signal processing circuit 106 to obtain CD data The resultant CD data is supplied to the CD encoding/decoding section 111. The CD encoding/decoding section 111 performs processing such as demodulation against EFM and error correction by use of CIRC for the reproduction data to obtain CD-ROM data The CD-ROM data, obtained in the CD-encoding/decoding section 111, is supplied to the CD-ROM encoding/decoding section 112 where the CD-ROM data is subjected to processings such as descrambling and error correction to obtain read data. The resultant read data is transmitted to the host computer under control of the SCSI/buffer controller 115 at a predetermined timing via the RAM 114 as a buffer memory.

Figure 11:
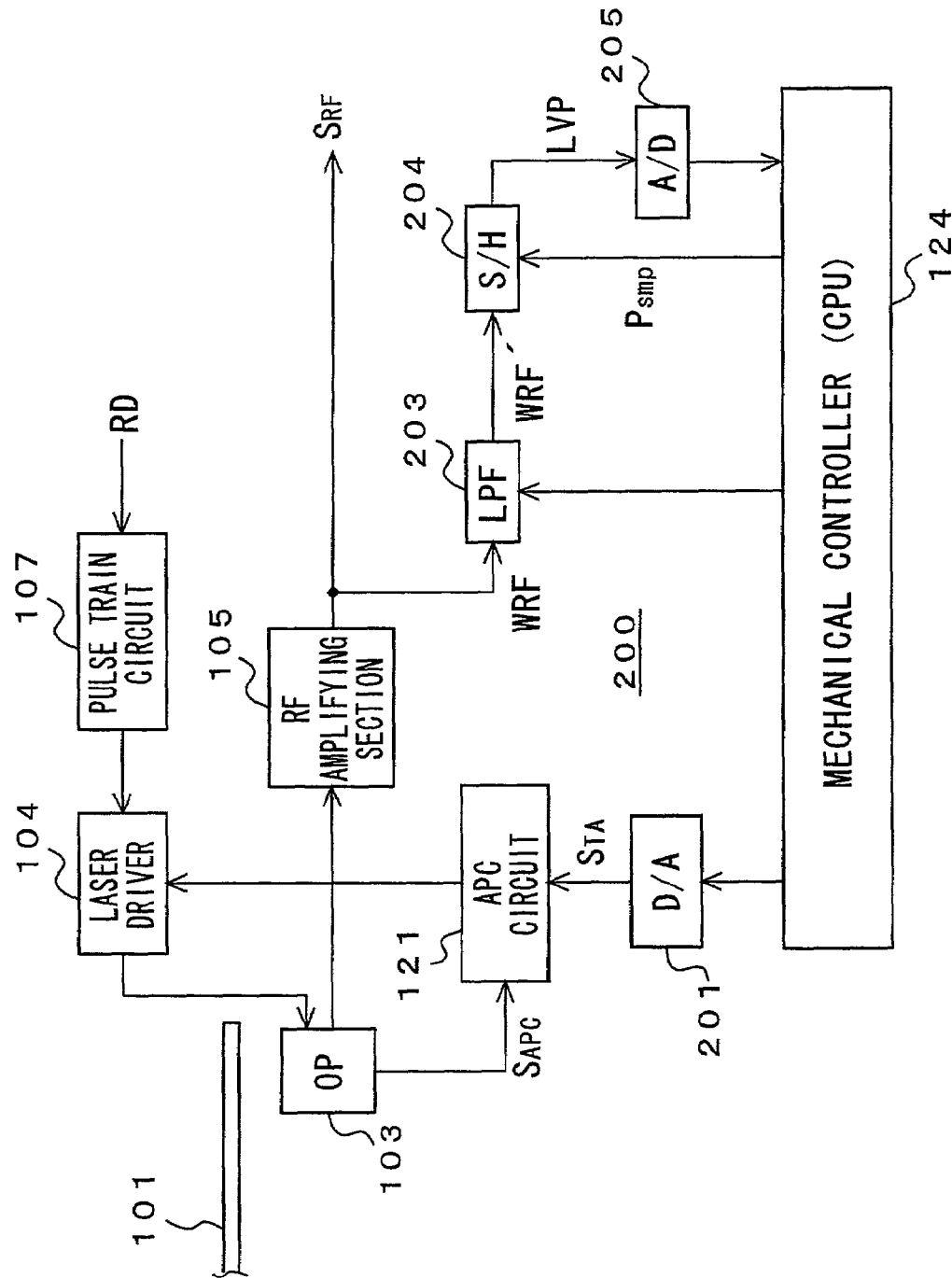
FIG. 11 is a block diagram showing a circuit section associated with an operation of R-OPC.

In addition, the CD-R drive 100 shown in FIG. 8 controls the laser power R-OPC during a recording operation. FIG. 11 shows a circuit section 200 related to the R-OPC operation. In FIG. 11, the constituent elements identical to those of FIG. 8 are denoted by the same reference numerals.

The circuit section 200 includes an Auto Power Control (APC) circuit 202. To the APC circuit 202, the detected signal $S_{APC}$ detected in the photodetector 157 for front APC of the optical pickup 103 (see FIG. 9) is supplied. In addition, to the APC circuit 202, a target level signal $S_{TA}$ is supplied from the controller 124 via a D/A converter 201. The APC circuit 202 controls the laser driver 104 in such a manner that the detected signal $S_{APC}$ and the target level signal STA become the same level.

The circuit section 200 also includes: a low-pass filter 203 for limiting the band of the write RF signal WRF output from the RF amplifying section 105 and for smoothing the variation in the write RF signal WRF which corresponds to the multi-pulse trains; and a sampling/holding circuit 204 for sampling the output signal WFR' from the low-pass filter 203 by use of a sample pulse Psmp supplied from the controller 124 at a predetermined timing corresponding to the portion with a predetermined pulse width of the recording data RD, so as to obtain a pit level (i.e. average level signal) LVP. The pit level LVP obtained as a result of the sampling in the sampling/holding circuit 204 is converted into a digital signal by the D/A converter 205, and is supplied to the controller 124.

FIG. 12A shows the write RF signal WRF corresponding to the portions with pulse widths 4T, 11T for example. FIG. 12B shows the output signal 'WRF' from the low-pass filter 203. The output signal WRF' is obtained by smoothing the variation in the write RF signal WRF corresponding to the multi-pulse trains. FIG. 12C shows the sample pulse Psmp for sampling the pit level of the portion with pulse widths 4T, 11T.

The frequency of the variation in the write RF signal which corresponds to the multi-pulse trains described above changes depending on the recording speed. Specifically, as the recording speed becomes higher, the frequency of the variation thereof becomes higher. In an embodiment of the present invention, the cutoff frequency of the low-pass filter 203 is changed in accordance with the recording speed under control of the controller 124, and only the variation in the write RF signal WRF which corresponds to the multi-pulse trains is efficiently smoothed, independent from the recording speed.

The output signal WRF' from the low-pass filter 203 has a portion at a constant level, and this is a portion with a relatively large pulse width. Therefore, a sample pulse Psmp corresponding to the portion with pulse width of 6T or larger is provided to the sampling/holding circuit 204, and then sampling at a pit level is performed. As has been described above, the purpose of performing R-OPC is to control the write power in correspondence with the variation in the reflection ratio at the inner and outer peripheries of the disc (i.e. CD-R) 101. Therefore, the sampling/holding circuit 204 is not required to perform the sampling at a pit level successively in a recording operation, but the sampling is performed at predetermined time intervals in an embodiment of the present invention.

Next an operation of R-OPC will be described. Before writing is started, trial writing is performed at a designated recording speed in the PCA of the disc 101 to obtain an optimum write power (i.e. a value at which an optimum asymmetry is obtained). At the optimum write power, the output signal WRF' from the low-pas filter 203 is sampled at a predetermined timing which corresponds to the portion with a predetermined pulse width of the recording data RD to obtain an optimum pit level LVPr. The cut-off frequency of the low-pass filter 203 is changed beforehand in such a manner as to correspond to the designated recording speed.

When writing is started, a target level signal STA which corresponds to the optimum write power which has been obtained beforehand as in the manner described above is supplied from the controller 124 to the APC circuit 202. As a result, the write power is controlled in such a manner as to be the optimum write power.

After writing is started, the output signal WRF' from the low-pass filter 203 is sampled at a predetermined timing which corresponds to the portion with a predetermined pulse width of the recording data RD at predetermined time intervals, so as to obtain the pit level LVP. The resultant pit level LVP is supplied to the controller 124 via the A/D converter 205.

The controller 124 modifies the level of the target level signal STA to be supplied to the APC circuit 202 in such a manner that the pit level LVP becomes equal to the optimum pit level LVPr which has been obtained beforehand in a manner described above. For this purpose, after the writing is started, the write power is controlled in such a manner that the pit level LVP becomes equal to the optimum pit level LVPr. As a result, the recording data RD can be recorded on the disc 101 in an excellent state, even if there are a variation (nonuniformity in the coating) in the reflection ratio at the inner and outer peripheries of the disc (i.e. CD-R) 101, a change in the distribution of spot strengths at coma aberration generated as a result of the skew of the disc 101, a change in the laser wavelength resulted from an increase in temperature, and the like.

As has been described above, in an embodiment of the present invention, in the operation of R-OPC, the write RF signal WRF is subjected to bandpass limitation in the low-pass filter 203 to smooth the variation in the write RF signal generated in correspondence with the multi-pulse trains. Then, the smoothed signal WRF' is sampled at a predetermined timing which corresponds to the portion with a predetermined pulse width to obtain a pit level (i.e. average level signal) LVP. The write power is controlled in such a manner that the pit level LVP becomes equal to the optimum pit level LVPr which has been obtained beforehand.

Specifically, the write RF signal WRF is subjected to bandpass limitation in the low-pass filter 203 to obtain the pit level LVP. This arrangement makes it possible to obtain the pit level LVP in a stable manner, independently of the influence of the multi-pulse trains, thereby controlling the write power in a stable manner during recording operation.

In the embodiment described above, the output signal WRF' from the low-pass filter 203 is sampled once in correspondence with the portion with a predetermined pulse width to obtain the pit level LVP (see FIG. 12C) in the sample/hold circuit 204. Alternatively, sampling may be performed at plural number of times in correspondence with the portion with a predetermined pulse width to obtain plural sampled signals, and the plural sampled signals are then averaged to obtain the pit level LVP. In this manner, it is possible to obtain the pit level LP in a stable manner independently of the influence of the multi-pulse trains, even if the low-pass filter 203 does not perform sufficient smoothing.

In the embodiment described above, the write RF signal WRF is subjected to bandpass limitation by the low-pass filter 203 in order to obtain the pit level LVP as the average level signal, and the output signal WRF' from the low-pass filter 203 is sampled at a predetermined timing. Alternatively, the average level signal (i.e. pit level LVP) may be obtained in other methods. As one of the employable methods for example, the write RF signal WRF is converted into a digital signal by a high-speed A/D converter, and conversion values within a predetermined range are averaged to obtain the pit level LNP.

In the embodiment described above, the present invention has been applied to the CD-R drive 100. However, the present invention is also applicable to other optical recording apparatuses for performing recording on a recording medium by use of multi-pulse trains, that is, for pulse train recording such as a phase change type CD-RW drive.

According to the present invention, the light returned from the recording medium is detected, and the average signal of the detected signal is obtained. The laser power is controlled in such a manner that the level of the average level signal becomes a predetermined level thereby enabling stable control of the write power during a recording operation, even in the case of performing pulse train recording.

What is claimed is:

1. An optical recording apparatus in which recording data is converted into multi-pulse trains, and a laser beam is emitted from a laser light source in correspondence with the multi-pulse trains, and the laser beam is irradiated on a recording medium to record the recording data on the recording medium, comprising:
    photodetecting means for detecting light returned from the recording medium;
    means for detecting a level of a signal detected by the photodetecting means; and
    laser power controlling means for controlling the power of the laser beam output from the laser light source so that the detected level becomes a predetermined level,
    wherein the means for detecting includes a filter configured to filter the detected signal to generate a filtered signal, and means for sampling the filtered signal during a recording pulse of the recording data at a timing that corresponds to a portion of the filtered signal having a pulse width that is greater than a predetermined pulse width.

2. The optical recording apparatus according to claim 1, further comprising:
    means for changing a cut-off frequency of the filter in accordance with a recording speed.

3. The optical recording apparatus according to claim 1, wherein the means for sampling samples the filtered signal from the filter at plural timings and averages the plural sampled signals to determine the level.

4. The optical recording apparatus according to claim 1, wherein the means for detecting detects the level at predetermined time intervals.

5. The optical recording apparatus of claim 1, wherein the portion of the filtered signal having a pulse width that is greater than a predetermined pulse width has a portion at a constant level.

6. The optical recording apparatus of claim 1, wherein the portion of the filtered signal, having a pulse width that is greater than a predetermined pulse width, is 6T or larger.

7. An optical recording apparatus, comprising:
    an optical head including a laser light source configured to emit a laser beam, so that the laser beam is irradiated on a recording medium;
    a converter configured to convert recording data into multi-pulse trains;

a driving circuit configured to allow the laser light source to emit the laser beam corresponding to the converted multi-pulse trains;

a photodetector provided in the optical head configured to detect light returned from the recording medium;

means for detecting a level of a signal detected by the photodetector; and a laser power controller configured to control power of the laser beam output from the laser light source so that the detected level becomes a predetermined level, wherein the means for detecting includes a filter configured to filter the detected signal to generate a filtered signal, and means for sampling the filtered signal during a recording pulse of the recording data at a timing that corresponds to a portion of the filtered signal having a pulse width that is greater than a predetermined pulse width.

8. An optical recording apparatus according to claim 7, further comprising:

means for changing a cut-off frequency of the filter in accordance with a recording speed.

9. An optical recording apparatus according to claim 7, wherein the means for sampling samples the filtered signal from the filter at plural timings and averages the plural sampled signals to determine the level.

10. An optical recording apparatus according to claim 7, wherein the means for detecting detects the level at predetermined time intervals.

11. An optical recording apparatus according to claim 7, wherein the driving circuit allows the laser light source to emit the laser beam at laser power adjusted in a laser power adjusting area formed in the recording medium.

12. The optical recording apparatus of claim 7, wherein the portion of the filtered signal having a pulse width that is greater than a predetermined pulse width has a portion at a constant level.

13. The optical recording apparatus of claim 7, wherein the portion of the filtered signal, having a pulse width that is greater than a predetermined pulse width, is 6T or larger.

14. A method for controlling laser power in an optical recording apparatus in which recording data is converted into multi-pulse trains, and a laser beam is emitted from a laser light source in correspondence with the multi-pulse trains, and the laser beam is irradiated on a recording medium to record the recording data on the recording medium, the method comprising:

obtaining a detected signal of light returned from the recording medium;

detecting a level of the detected signal; and controlling the power of the laser beam output from the laser light source so that the level of the detected level becomes a predetermined level, wherein the detecting step includes filtering the detected signal to generate a filtered signal, and sampling the filtered signal during a recording pulse of the recording data at a timing that corresponds to a portion of the filtered signal having a pulse width that is greater than a predetermined pulse width.

15. The method of claim 14, wherein the portion of the filtered signal having a pulse width that is greater than a predetermined pulse width has a portion at a constant level.

16. The method of claim 14, wherein the portion of the filtered signal, having a pulse width that is greater than a predetermined pulse width, is 6T or larger.

* * * * *

UNITED STATES PATENT AND TRADEMARK OFFICE
CERTIFICATE OF CORRECTION

PATENT NO. : 7,379,406 B2  Page 1 of 1
APPLICATION NO. : 09/963076
DATED : May 27, 2008
INVENTOR(S) : Kenji Nagashima et al.

It is certified that error appears in the above-identified patent and that said Letters Patent is hereby corrected as shown below:

Column 1, line 28, Delete "(EUM)" should read --(EFM)--.

Column 2, line 23, Delete "CUR" should read --CD-R--.

Column 3, line 47, Delete "s trial" should read --started trail--.

Column 9, line 10, Delete "detected of" should read --detected signal of--.

Column 11, line 6, Delete "STA" should read --$S_{TA}$--, line 20, Delete "STA" should read --$S_{TA}$--, line 60, Delete "LP" should read --LVP--.

Column 12, line 7, Delete "LNP" should read --LVP--.

Signed and Sealed this

Sixteenth Day of December, 2008

JON W. DUDAS
*Director of the United States Patent and Trademark Office*